United States Patent [19]

Hamada

[11] Patent Number: 5,052,783
[45] Date of Patent: Oct. 1, 1991

[54] PROJECTION TYPE IMAGE DISPLAY APPARATUS

[75] Inventor: Hiroshi Hamada, Nara, Japan

[73] Assignee: Sharp Kabushiki Kaisha, Osaka, Japan

[21] Appl. No.: 423,335

[22] Filed: Oct. 18, 1989

[30] Foreign Application Priority Data

Oct. 26, 1988 [JP] Japan .................. 63-270181

[51] Int. Cl.⁵ .............................. G02F 1/13
[52] U.S. Cl. ...................... 359/40; 359/54; 359/49
[58] Field of Search .......... 350/331 R, 334, 339 R, 350/345, 114, 347 V

[56] References Cited

U.S. PATENT DOCUMENTS

| | | | |
|---|---|---|---|
| 4,632,522 | 12/1986 | Ishitani | 350/570 |
| 4,686,519 | 8/1987 | Yoshida et al. | 350/345 |
| 4,765,718 | 8/1988 | Henkes | 350/331 R |
| 4,790,632 | 12/1988 | Miyakawa et al. | 350/334 |
| 4,798,448 | 1/1989 | Van Raalte | 350/345 |
| 4,807,978 | 2/1989 | Grinberg et al. | 350/331 R |
| 4,836,652 | 6/1989 | Oishi et al. | 350/334 |
| 4,865,425 | 9/1989 | Kobayashi et al. | 350/331 R |
| 4,957,351 | 9/1990 | Shioji | 350/339 R |

FOREIGN PATENT DOCUMENTS

| | | |
|---|---|---|
| 0030875 | 6/1981 | European Pat. Off. ............ 350/345 |
| 60-165621 | 8/1985 | Japan . |
| 60-165622 | 8/1985 | Japan . |
| 60-165623 | 8/1985 | Japan . |
| 60-165624 | 8/1985 | Japan . |
| 60-262131 | 12/1985 | Japan . |

Primary Examiner—Rolf Hille
Assistant Examiner—Tan Ho

[57] ABSTRACT

In a liquid crystal image display apparatus, an image of pixels of a liquid crystal display panel are projected onto a projection surface. The apparatus includes a light source, the liquid crystal display panel, microlens arrays provided respectively at a side of the liquid crystal display panel facing the light source and at another side thereof facing the projection surface, and a condenser lens provided between the light source and the microlens array located at the light source side of the display panel. The microlens arrays include a plurality of microlenses provided in positions corresponding to the plurality of pixels of the liquid crystal display panel, and pitches of the microlenses of the microlens array at the light source side are set to be larger than pitches of the pixels, while the pitches of the microlenses of the microlens array at the projection surface side are set to be smaller than those of the pixels.

18 Claims, 7 Drawing Sheets

PROJECTION TYPE IMAGE DISPLAY APPARATUS

BACKGROUND OF THE INVENTION

1. Field of the Invention

The present invention relates generally to a projection type image display apparatus comprising non-emissive display panels of a matrix type (e.g., liquid crystal display panels) and microlens arrays. More particularly, it relates to the projection type image display, apparatus in which a bright display is achieved over the entire region of the panel.

DESCRIPTION OF THE BACKGROUND ART

A non-emissive display panel employed in the present invention, which does not emit light per se, has its light transmittance varied by a driving signal. Images and characters are displayed by modulating the intensity of light emitted from an external light source. Examples of the non-emissive display panel, are a liquid crystal display panel, an electrochromic display, and a display using PLZT as an electro optical material or the like. The liquid crystal display panel is particularly widely used for portable TV, word processors and the like. Minimum display units called pixels are regularly provided in such a panel. Application of individual drive voltages to the respective pixels causes the images and characters to be displayed. As a method of applying the individual drive voltages to the respective pixels, there exists a simple matrix driving method and an active matrix driving method. FIG. 1 shows a schematic equivalent circuit of a liquid crystal display panel employing active matrix driving. Referring to FIG. 1, the active matrix driving type liquid crystal display panel comprises TFTs 24 provided in matrix at respective intersections of X electrodes 22 and Y electrodes 23, with liquid crystal elements 25 forming pixels connected to the TFTs 24. FIG. 2 is a diagram illustrating in detail the periphery of one of the pixels shown in FIG. 1. Referring to FIG. 2, a thin film transistor TFT 24 is provided at an intersection of a gate bus line corresponding to one of the X electrodes 22 and a source bus line corresponding to one of the Y electrodes 23, with a drain thereof connected to the pixel electrode 25.

In the active matrix type liquid crystal display apparatus, driving signal lines, gate bus lines and source bus lines, for supplying the drive voltages to the respective pixels need be provided among the pixels. Therefore, the ratio of a pixel region occupying a screen (aperture) decreases. A portion of the light illuminating the panel, which does not impinges on portions other than the pixel region, does not contribute to the display and thus becomes useless. Therefore, there was a disadvantage that the screen became darker as the aperture of the panel decreased even if the same light source was employed.

To eliminate this disadvantage, a microlens array (in which microlenses are regularly arranged in two dimensions) is employed to the display panel. Convergence of the illuminating light on the pixel region results in enhanced brightness of the display screen. The details of this process is disclosed in, for example, Japanese Laid Open Patent Nos. 60-165621-165624 and 60-262131.

FIG. 3 is a perspective view illustrating a state that the microlens array 2 is attached to the active matrix type liquid crystal display apparatus 1. Referring to FIG. 3, the active matrix type liquid crystal display apparatus 1 comprises a pixel electrode 25, shown in FIG. 1, an aligning layer/counter electrodes 28 provided on the pixel electrode 25 (now shown) and on the place opposing the pixel electrode 25, a glass substrate 26 provided below the pixel electrode 25, a color filter 27 provided above the aligning layer/counter electrode 28, and another glass substrate 26 provided above the color filter 27.

As shown in FIG. 3, each of the microlenses is provided in a position corresponding to one pixel of the display panel. The light from the light source impinges on each pixel electrode 25 through each microlens. Thus, pitches of the microlenses constituting the microlens array 2 have been made equal to pitches of the pixels of the display panel 1.

FIG. 4 is a diagram illustrating a principle of image projection in a conventional projection type image display apparatus. A projection optical system being the same as that used in a slide projector, is employed. The non-emissive display panel 1 is provided in place of a slide, and an image displayed on the display panel is projected in magnification by employing the light source. An image of the light source 5 is formed in a projection lens 3 in this optical system, as shown in FIG. 4. The image on the display panel 1 is projected on a screen 6 through the projection lens 3. In this case, light from the light source 5 is converged by a condenser lens 4 at the periphery of the display panel 1 (i.e., a position apart from an optical axis in this figure,) but passes obliquely rather than normally to the display panel 1. This angle $\theta$ deviated from the right angle becomes larger This as the display panel 1 becomes larger or a distance between the display panel 1 and the projection lens 3 becomes shorter.

FIGS. 5A and 5B are enlarged views of the periphery of the display panel 1 shown in FIG. 4. Referring to the FIGS. 5A and 5B, the display panel 1 comprises pixel regions 1b and bus lines or TFT regions 1c. Microlenses, arrays 2a and 2b including a plurality of microlenses arranged in the same pitches as those of the pixels of the display panel, are provided respectively at opposite sides of the display panel 1, i.e., at the side facing the light source with the other side facing the projection lens.

Referring to these figures, in the case that the pitches of the pixels of the display panel are equal to those of the microlenses of the microlens arrays, an increase of the deviation angle $\theta$ causes the following two phenomena.

(1) The light from the light source is focused near the pixels by the microlenses at the side facing the light source to form an image of the light source. However, if the angle $\theta$ is large, the image of the light source extends beyond the pixel regions 1b, as shown in FIG. 5A. The light impinges absorbed or scattered on non-display region and thus becomes useless.

(2) As shown in FIG. 5B, the light passing through the center of the microlenses 2a at the side facing the light source does not pass through the center of the microlenses 2b at the side facing the projection lens. Therefore, the incident light changes its direction so as to not be directed toward the projection lens 3. The angle $\theta$ between the optical axis and the angle of the incidence of the light becomes larger as it becomes distant from the center of the screen. Thus, a projected image becomes darker as it becomes distant from the center of the screen due to these phenomena.

SUMMARY OF THE INVENTION

It is an object of the present invention to prevent darkening of even the periphery of a projected image in a projection type image display apparatus.

It is another object of the present invention not to prevent making pitches of microlenses of a microlens array equal to pitches of pixels of a liquid crystal display apparatus in the projection type image display apparatus.

It is a further object of the present invention to have light, which passes through the center of microlenses at the side facing a light source, pass through the pixels and through the center of microlenses at the side facing a projection lens, in the projection type image display apparatus.

The above described objects of the present invention are achieved by the f... the projection type image display apparatus comprises the following, that is, the projection type image display apparatus, for projecting light from the light source onto a non-emissive display portion according to the present invention and then projecting an image of the display portion on a predetermined projection screen, comprises a display panel in which a plurality of pixels arranged apart from each other by a predetermined first spacing in a matrix, a first microlens array provided at the side of the display panel facing the light source, which includes a plurality of microlenses arranged apart from each other by a predetermined second spacing in corresponding positions of the plurality of pixels on the display panel, and a second microlens array provided at the other side of the display panel facing the projection screen, which includes a plurality of microlenses arranged in corresponding positions of the plurality of pixels on the display panel. Furthermore, the first and second spacings are selected to be different from each other.

Since the projection type image display apparatus according to the present invention comprises the above described elements, pitches of the microlenses facing the light source differs from pitches of the pixels on the display panel. Therefore, the pitches of the microlenses are determined such that the light from the light source passing through the periphery passes through the center of the corresponding pixels on the display panel. As a result, even the periphery of a projected image does not become darker in the projection type image display apparatus.

Preferably, a condenser lens is provided between the light source and the display portion to focus the light from the light source on the side facing the projection screen, and the second spacing is selected to be larger than the first spacing; and further, the plurality of microlenses of the second microlens array are arranged apart from each other by a predetermined third spacing, which is selected to be smaller than the first spacing.

More preferably, since the projection type image display apparatus according to the present invention comprises the above described elements, the light passing through the center of the microlenses at the side facing the light source passes through the center of the microlenses at the side facing the projection lens. Therefore, the incident light is effectively directed to the projection lens without changing its direction. Consequently, the projected image over the entire screen has a predetermined brightness in the projection type image display apparatus.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
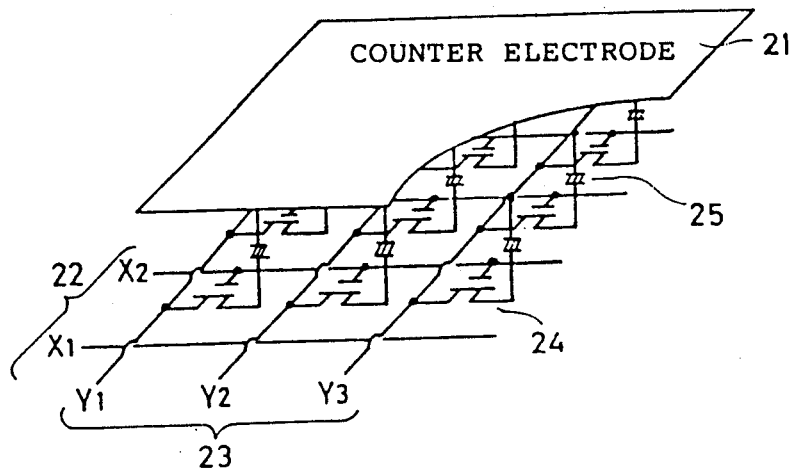
FIG. 1 is a schematic equivalent circuit diagram of a liquid crystal display panel of active matrix type.
Figure 2:
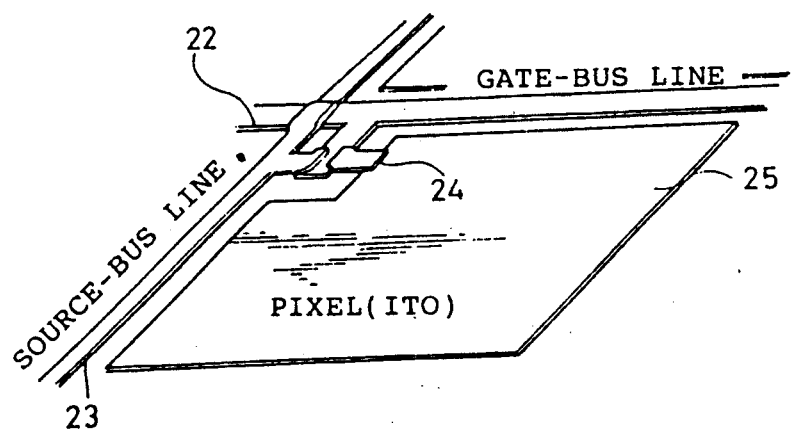
FIG. 2 is an enlarged view of the periphery of one of the pixels of the liquid crystal display panel shown in FIG. 1.
Figure 3:
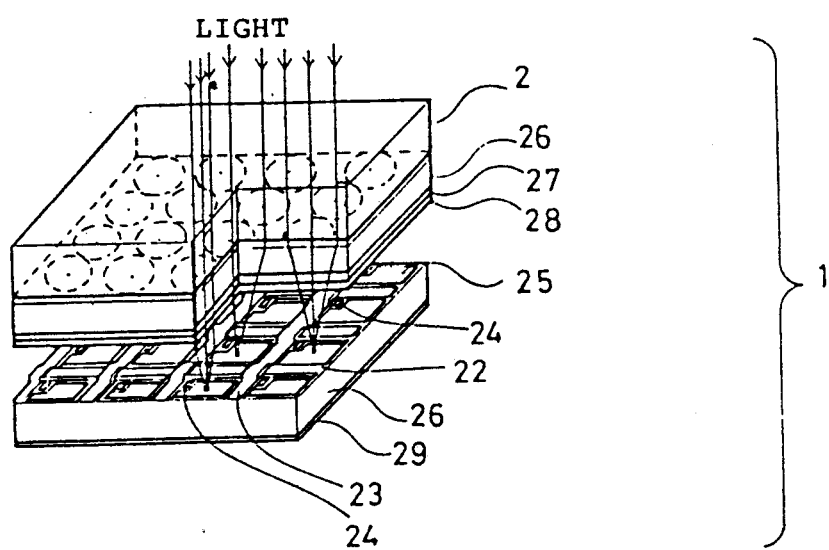
FIG. 3 is a perspective view illustrating a state that a microlens array is attached onto an active matrix type liquid crystal display apparatus.
Figure 4:
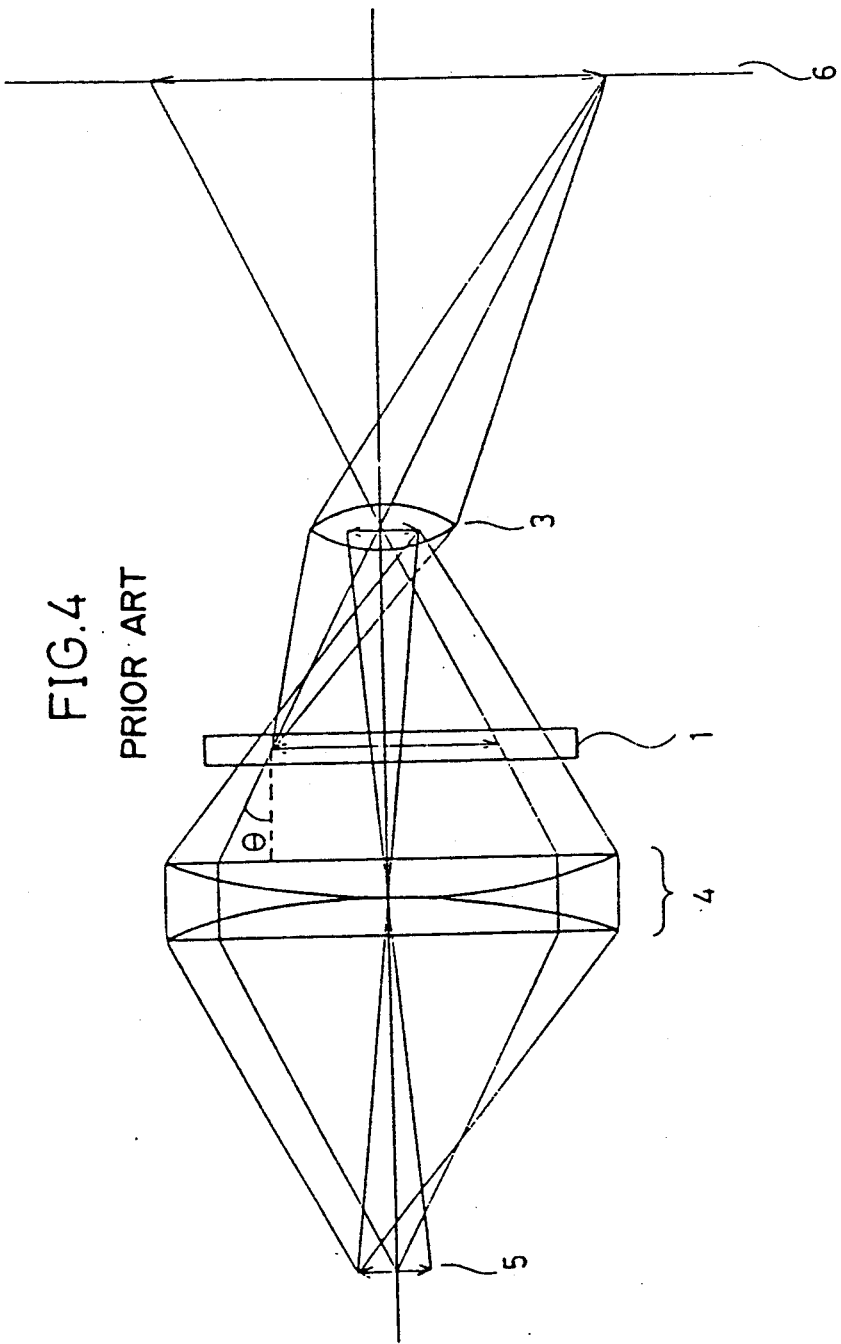
FIG. 4 is a diagram illustrating an image projection optical system of the projection type image display apparatus.
Figure 5:
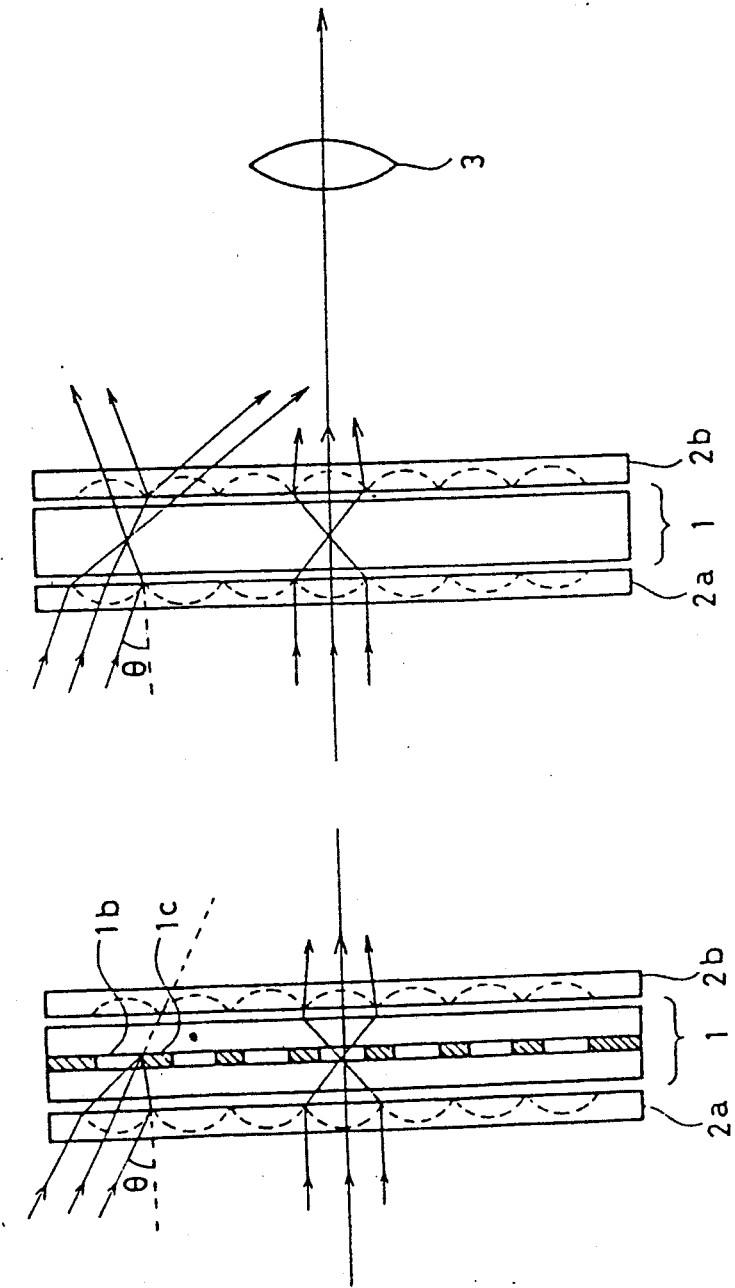
FIGS. 5A and 5B are enlarged views of the display panel portion shown in FIG. 4.
Figure 6:
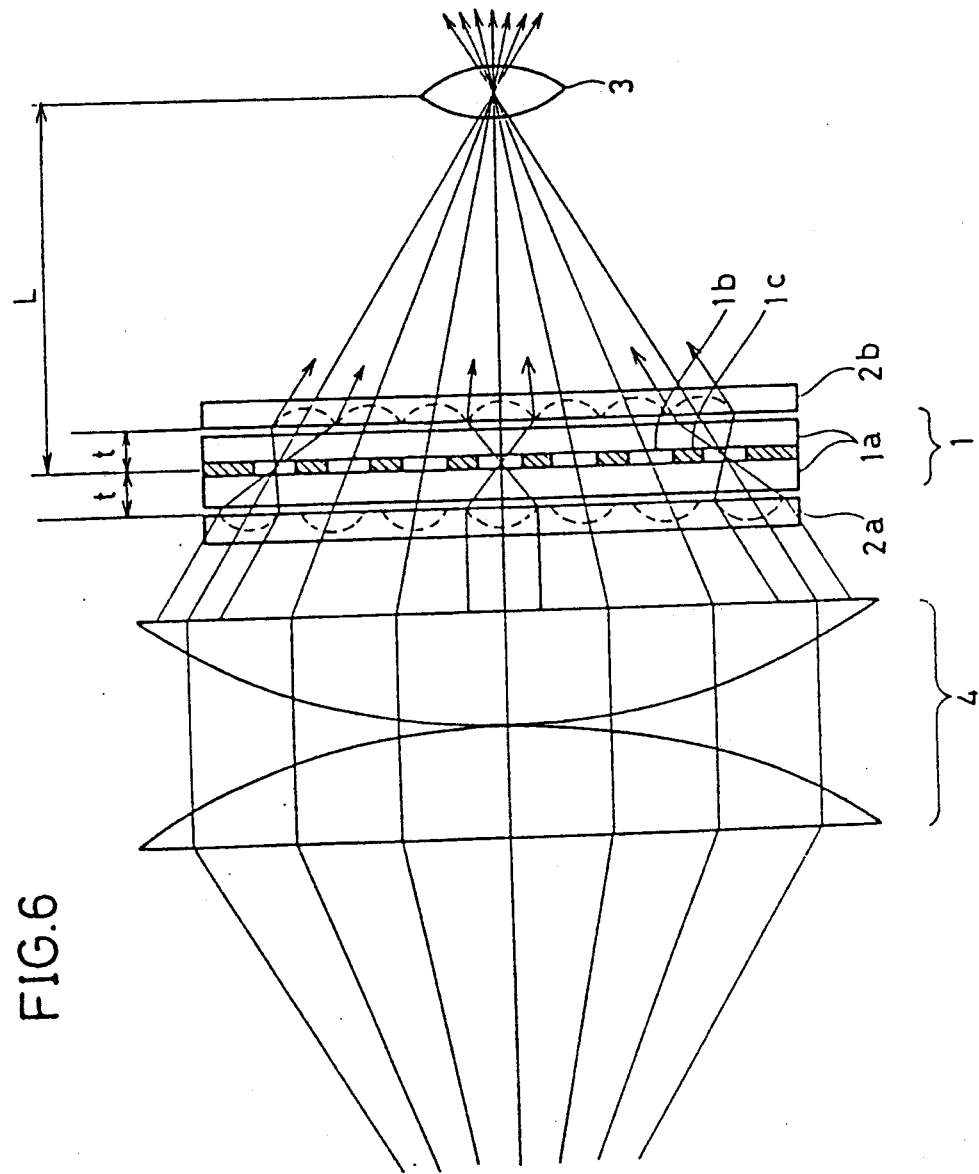
FIG. 6 is a top view of the projection type image display apparatus to which the present invention is applied.

Referring to FIG. 6, a liquid crystal display panel 1 of the matrix type and an equivalent type and equivalent type has pixels which are display units arranged regularly in a portion sandwiched between substrates 1a. A microlens array 2a having larger pitches than those of the pixels is attached to the front of the liquid crystal display panel 1. A condenser lens 4 and a light source 5 (not shown) are provided in front of the microlens array 2a. A microlens array 2b having smaller pitches than those of the pixels is attached to the rear of the liquid crystal display panel 1. A projection lens 3 and a screen 6 (not shown) are provided further in the rear of the panel. It is now assumed that a distance from the center of the liquid crystal display panel 1 to the projection lens 3 is represented by L. A distance between a surface in which the pixels of the display panel 1 are arranged and a plane surface in which the microlens array 2a and 2b is provided is represented by t, which is nearly equal to a thickness of the substrate 1a of the display panel 1.

As shown in FIG. 6, the microlens arrays 2a and 2b display panel 1. This arrangement, however, is made only for convenience of a description thereof, and thus, in practicality, there is no spacing between these microlens arrays.

Light from the light source, not shown, is converged by the condenser lens 4 and transmitted through the microlens array 2a, the liquid crystal display panel 1 and the micrlens array 2b to be imaged on the projection lens 3 and projected on the screen, not shown.

Figure 7:
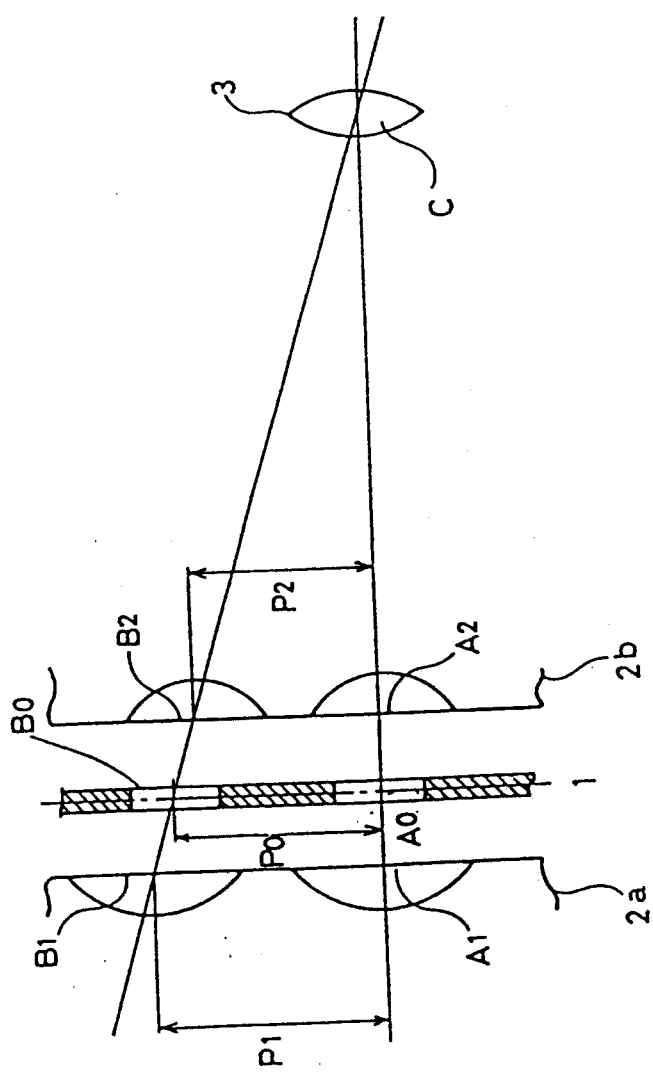
FIG. 7 is a view illustrating a relationship between pitches of pixels of the display panel and those of microlenses of the microlens array.

A description will be given of the relationship between a lens pitch of the micrlens arrays and a pixel pitch of the liquid crystal display panel 1 with reference to FIG. 7. For simplification, the relationship will be described between a pixel at the center of the screen (on an optical axis) and an adjacent pixel. A central portion of the pixel at the center of the screen is represented by $A_0$, the central portions of the corresponding microlenses are respectively represented by $A_1$ and $A_2$, the adjacent pixel is $B_0$, and the central portions of their corresponding microlenses are $B_1$ and $B_2$. Since a liquid crystla layer is several μm thick, it is negligible in this figure.

A length between $\overline{A_0B_0}$ is represented by $P_0$ (the pixel pitch), and $\overline{A_1B_1}=P_1$, $\overline{A_2B_2}=P_2$ (the pitches of the microlenses).

$\overline{A_0A_1}$ and $\overline{A_0A_2}$ both are equal to the value t/n, which is obtained by dividing the thickness t of the substrate of the liquid crystal panel by a refractive index n of the substrate in order to convert the t into an optical path length in the air.

Assuming that the location of the projection lens 3 on the optical axis is C, triangles $A_0B_0C$, $A_1B_1C$ and $A_2B_2C$ are similar to one another.

Therefore, the following equalities are given:

$$\begin{aligned} P_1/P_0 &= \overline{A_1C}/\overline{A_0C} \quad (1) \\ &= (L + t/n)/L \\ &= 1 + t/(n \cdot L) \\ P_2/P_0 &= \overline{A_2C}/\overline{A_0C} \quad (2) \\ &= (L - t/n)/L \\ &= 1 - t/(n \cdot L) \end{aligned}$$

That is, if the pixel pitch and the pitches of the microlenses are selected in such relationship as expressed in the above equalities (1) and (2), the light from the light source passes through the central portions of the microlenses and the pixels. As a result, a projected image does not become darker at the central portion of the display panel nor at the peripheral portion thereof in the projection type image display apparatus such as the active matrix type liquid crystal display apparatus.

A practical application of the present invention will now be described. Such a case will be described that the present invention is applied to a liquid crystal display panel employed for a pocket type liquid crystal color TV „. (the apparatus type number 3C-EI, 3E-J1, for example), which is put in the market by the applicant of the present invention as the liquid crystal display panel. The size of a screen of this liquid crystal display panel is 45.6 mm high by 61.8 mm wide. The pixel pitch $P_0$ is 190. μm in the vertical direction and 161 μm in the horizontal direction, the thickness t of the substrate is 1.1 mm, and the refractive index n of the substrate is 1.5. A focal length of the projection lens is 200 mm, and L is approximately 200 mm.

The microlens array is manufactured by a method of obtaining a refractive index profile type lens by selective ion diffusion (Electronics Letters Vol. 17 No. 13 p. 452 (1981) ). In this method, a glass plate is dipped in molten salt. A kind of metal ion, such as alkaline ions, are exchanged between the glass plate and the molten salt through a mask provided on the glass plate. As a result, the glass plate is obtained which has refractive index profile corresponding to a mask pattern.

The pitch of the microlens array 2a at the side facing the light source is determined to be 190.7 μm in the vertical direction and 161.6 μm in the horizontal direction according to the equation (1). The pitch of the microlens array 2b at the side facing to the projection lens is determined to be 189.3 μm in the vertical direction and 160.4 μm in the horizontal direction according to the equation (2). Correction of the pitches is not carried out for comparison, and a microlens array having the same pitch as the pixel pitch is also manufactured. Each microlens has a diameter of 150 μm and a focal length of 720 μm (=t/n) in the atmosphere.

Such a microlens array is employed for a projection type color liquid crystal display apparatus.

Only the central portion of the screen is effectively used for projection in the one in which the pitch correction of the microlens array is not carried out. The reason for this will be described as follows. That is, the light from the condenser lens 4 does not enter at the right angle to the liquid crystal display panel 1 but at a certain angle $\theta$ in the end portions of the display panel 1.

In this case, the angle $\theta$ is expressed as follows.

$$\begin{aligned} \tan \theta &= \{(\text{the width of the display panel})/2\}/L \\ &= \{(61.8)/2\}/200 \\ &= 0.1545 \end{aligned}$$

In the case of no pitch correction of the microlens array, the light, which passes through the center of the microlenses at the side facing the light source and is then directed to the center of the projection lens, passes (t/n) x tan $\theta$ =113 μm apart from the center of the pixels. This deviation is larger than half the pixel pitch, so that it extends to the adjacent pixel. Furthermore, this light passes 226 μm apart from the center of the microlenses at the side facing the projection lens. This deviation is larger than one pixel pitch of the microlens array, and thus does not reach the projection lens.

Meanwhile, in the case of correcting the pitch of the microlens array according to the present invention, the light from the light source can effectively be utilized in even the peripheral portion of the projected image. Therefore, distribution of luminance becomes uniform over the entire screen, resulting in enhanced visibility.

In the above described embodiment, since the condenser lens 4 is provided at the side of the liquid crystal display panel facing the light source, the pitch of the microlens array at the light source side is made larger than the pixel pitch. On the other hand, if the condenser lens 4 is provided at the projection lens side, the pixel pitch is made larger than the pitch of the microlens array. No change can be seen in the capacity of light convergence in either case of facing a convex surface of the microlens array toward the display panel or away from it. However, the distance t varies, which is between the plane surface on which the pixels of the display panel are arranged and the surface on which the microlens array is provided. Therefore, the pitch and focal length of the microlens array need be varied in accordance with the variation of the distance t.

The present invention can also achieve the same effect when applied to a cylindrical lens (a semicylindrical lens or a lenticular lens) as it is applied to the spherical lens array as described above.

Figure 8:
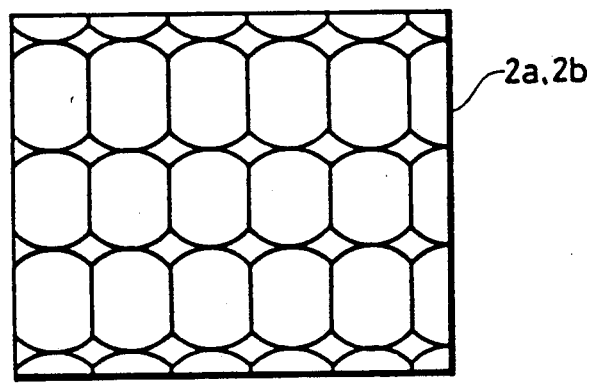
FIG. 8 is a plan view of a microlens array in which boundaries of each microlens are partially fused.

When the pitch of the pixels of the display panel in the width direction differs from that if the height direction, a microlens array in which boundaries of each microlens are partially fused may be used. In this case, an area to receive light can be increased. An example of such a lens is shown in FIG. 8.

The description of the present invention has been given with respect to the case of employing the microlens array formed by the method of obtaining the refractive index profile type lens through the selective ion diffusion. As a matter of course, the present invention is also applicable to a microlens array formed by another method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type image display apparatus in which light from a light source is projected through a projection lens onto a non-emissive display portion, and an image of the display portion is then projected onto a predetermined projection surface, the display portion comprising:
   a display panel, including a substrate of a refractive index n, on which a plurality of pixels are arranged in a matrix, separated from each other by a predetermined first pitch $P_0$; and
   first microlens array, provided between the display panel and the light source, the first microlens array including a plurality of microlenses separated from each other by a predetermined second pitch $P_1$ and arranged in positions corresponding to the plurality of pixels on the display panel,
   said first pitch $P_0$ and said second pitch $P_1$ being of different values and
   satisfying the equation,
   $P_1 = P_0 \cdot \{1 + t/(n+L)\}$, wherein t equals the distance between the display panel and the first microlens array and L equals the distance between the projection lens and the display panel.

2. A projection type image display apparatus according to claim 1, further comprising:
   a second microlens array, provided between the display panel and the projection surface, the second microlens array including a plurality of microlenses arranged in positions corresponding to the plurality of pixels on the display panel.

3. A projection type image display apparatus according to claim 2, wherein
   said plurality of microlenses of said second microlens array are separated from each other by a predetermined third pitch $P_2$, and wherein
   said third pitch $P_2$ is smaller in value than said first pitch $P_0$.

4. A projection type image display apparatus according to claim 3, wherein
   said plurality of pixels are arranged on a first plane surface on said display panel;
   said plurality of microlenses on said first microlens array are provided on a second plane surface;
   said plurality of microlenses of said second microlens array are provided on a third plane surface;
   wherein a distance between said first plane surface and either of said second and third plane surfaces is t, and
   pitch $P_2$ of said array satisfies the following expression, $P_2 = P_0 \{1 - t/(n \cdot L)\}$.

5. A projection type image display apparatus according to claim 4, wherein
   said plurality of pixels are formed in rows of a first direction and in rows of a second direction perpendicular to said first direction;
   said plurality of microlenses of said first and second microlens arrays are provided in said first direction and in said second direction;
   said plurality of microlenses formed in said second direction are integrated; and
   said first and second microlens arrays include cylindrical lenses separated from each other by the predetermined second pitch $P_1$ in said first direction.

6. A projection type image display apparatus according to claim 5, wherein
   said cylindrical lenses include semicylindrical lenses.

7. A projection type image display apparatus according to any one of claims 1 and 2, further comprising:
   at least one condenser lens the light source and the display panel, for focusing light from the light source onto the predetermined projection surface, wherein the
   first pitch $P_1$ is smaller in value than the second pitch $P_1$.

8. An image display device comprising:
   display panel on which a plurality of pixels are arranged in a matrix, separated from each other by a predetermined first pitch;
   first microlens array, provided between said display panel and a light source, including a plurality of microlenses separated from each other by a predetermined second pitch and arranged in positions corresponding to the plurality of pixels on the display panel; and
   second microlens array, provided between said display panel and an image display surface, including a plurality of microlenses separated from each other by a predetermined third pitch and arranged in positions corresponding to the plurality of pixels on the display panel,
   said predetermined first, second, and third pitch each being of a different value.

9. The image display device of claim 8 wherein,
   said first pitch is larger in value than said third pitch.

10. The image display device of claim 8 wherein,
    said second pitch is larger in value than said first pitch.

11. The image display device of claim 10 wherein,
    said first pitch is larger in value than said third pitch.

12. A projection type image display apparatus in which light from a light source is projected through a projection lens onto a non-emissive display portion, and an image of the display portion is then projected onto a predetermined projection surface, said display portion comprising:
    a display panel on which a plurality of pixels are arranged in a matrix, separated from each other by a predetermined first pitch; and
    first microlens array, provided between the display panel and the light source, and including a plurality of microlenses separated from each other by a predetermined second pitch and arranged in positions corresponding to the plurality of pixels on the display panel,
    said predetermined first pitch being smaller in value than said predetermined second pitch.

13. A projection type image display apparatus according to claim 12, further comprising:
    second microlens array, provided between the display panel and the predetermined projection surface, and including a plurality of microlenses arranged in positions corresponding to the plurality of pixels on the display panel.

14. A projection type image display apparatus according to claim 13, wherein
said plurality of microlenses of said second microlens array are separated from each other by a predetermined third pitch, and
said third pitch is smaller in value than said first pitch.

15. A projection type image display apparatus according to claim 14, wherien
said plurality of pixels are arranged on a first plane surface on said display panel;
said plurality of microlenses on said first microlens array are provided on a second plane surface;
said plurality of microlenses of said second microlens array are provided on a third plane surface;
wherein a distance between said first plane surface and either of said second and third plane surfaces is t,
a refractive index of a substrate of the display panel is n,
a distance between the display panel and the projection lens is L,
said first pitch is $P_0$, said second pitch is $P_1$, and said third pitch is $P_2$, and
pitches $P_1$ and $P_2$ of said first and second microlens arrays are selected to satisfy the following expressions:

$$P_1 = P_0 \cdot \{1 + t/(n \cdot L)\}$$

$$P_2 = P_0 \cdot \{1 - t/(n \cdot L)\}$$

16. A projection type image display apparatus according to claim 15, wherein
said plurality of pixels are formed in rows of a first direction and in rows of a second direction perpendicular to said first direction;
said plurality of microlenses of said first and second microlens arrays are provided in said first direction and in said second direction;
said plurality of microlenses formed in said second direction are integrated; and
said first and second microlens arrays include cylindrical lenses separated from each other by the predetermined second pitch in said first direction.

17. A projection type image display apparatus according to claim 16, wherien
said cylindrical lenses include semicylindrical lenses.

18. A projection type image display apparatus according to any one of claims 12 and 13, further comprising:
condenser lens, provided between the light source and the display panel, for focusing light from the light source onto the predetermined projection surface.

* * * * *